June 26, 1923.
E. F. McGILLICUDDY
VEHICLE SIGNAL
Filed Aug. 9, 1922
1,459,919
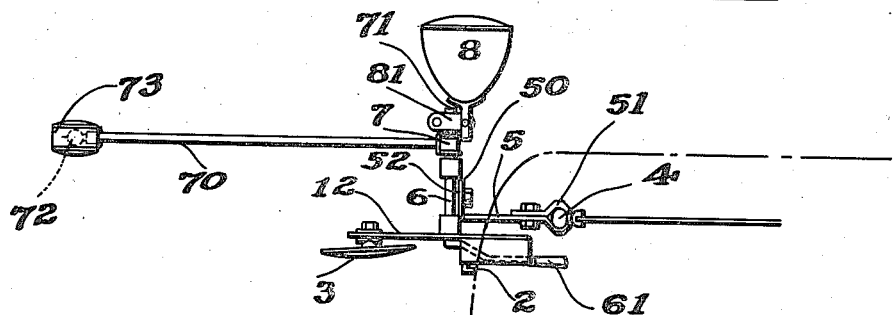
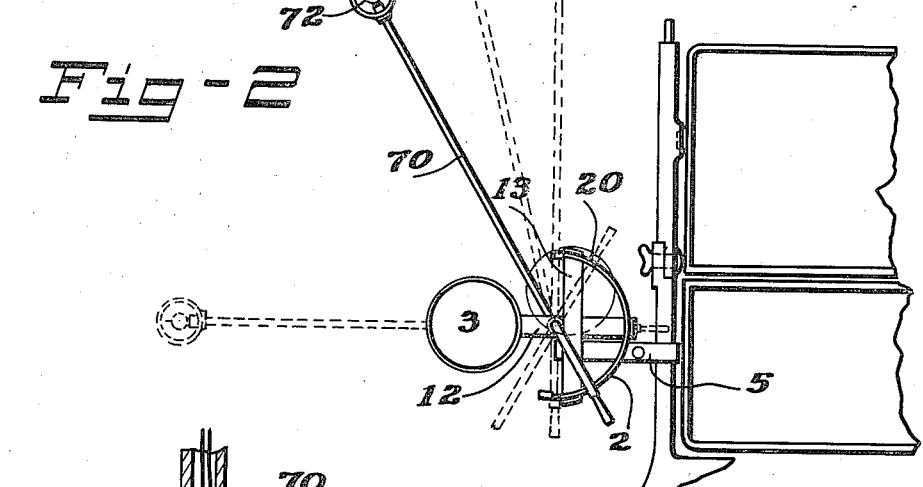
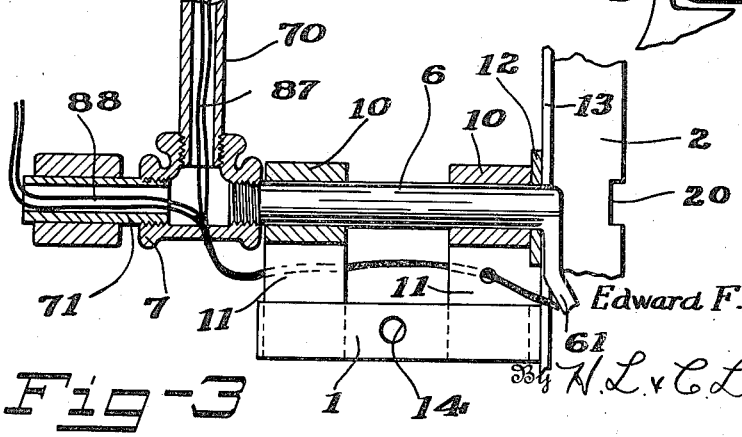
Inventor
Edward F. McGillicuddy
By H.L. & C.L. Reynolds,
Attorneys Patented June 26, 1923.

1,459,919

UNITED STATES PATENT OFFICE.

EDWARD F. McGILLICUDDY, OF SEATTLE, WASHINGTON.

VEHICLE SIGNAL.

Application filed August 9, 1922. Serial No. 580,690.

*To all whom it may concern:*

Be it known that I, EDWARD F. McGILLICUDDY, a citizen of the United States of America, and resident of the city of Seattle, in the county of King and State of Washington, have invented certain new and useful Improvements in Vehicle Signals, of which the following is a specification.

My invention relates to signals for vehicles and particularly to a signal and bracket therefor which is intended for mounting upon the windshield of an automobile.

My invention has for its object to provide a signal and bracket combined which will support the various accessories which are generally mounted upon the wind-shield support of an automobile, to the end that the driver has a signal convenient for use, and to the further end that all are adequately supported by a single device.

A further object is to provide a simple form of signal particularly adapted for use with such a bracket.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is a plan view of the signal and bracket and the parts associated therewith, the windshield and its support being shown in section.

Figure 2 is an elevation of the device as seen from the rear of the car.

Figure 3 is a longitudinal section through the axis of the rotative signal shaft.

It is the custom to support a mirror and generally a spotlight upon the windshield of an automobile in a position which is accessible from the driver's seat. It is also desirable to support a signal in a like position, but with many signals which have been proposed it has been impossible to secure all of these accessories upon the windshield or its support in accessible positions. I propose, therefore, to provide such a signal and bracket therefor which will be peculiarly adapted for the support of the usual accessories, such as the mirror and spotlight, and to that end my invention consists in the bracket and the signal which are peculiarly adapted to cooperate one with the other for the purposes set forth.

The foundation of my device comprises a longitudinally extending strap 1 which has along its upper edge bearings 10. These are shown as mounted not directly upon the strap 1 but upon vertically extending spacing straps 11. A transversely extending strap 12 is secured to the rear end of the strap 1, or as shown, to the upper ends of the straps 11. To this transversely extending strap 12 I secure a circular segmental strap 2. A vertical cross strap 13 may be employed to brace the strap 2, if desired. The strap 2 is provided with a series of notches 20 the purpose for which will appear later. At the outer end the transverse strap 12 is bored and within this bore is secured the securing bolt of a mirror 3.

A suitable clamp is provided for supporting the bracket from the windshield or its support 4. I have shown a bar 5 having a lateral extension 50. The main body of the bar 5 forms one half of a clamp, the other half 51 of which cooperates therewith to clamp upon the support 4 of the windshield, in a well-known manner. A bolt 52 is passed through a hole provided in the lateral extension 50 and through a hole 14 in the main strap 1. By this means the angular position of the bracket in a vertical plane can be adjusted upon loosening the nut upon the bolt 52. This is especially desirable for use upon automobiles whose windshields slope backwards.

A shaft 6 is received in the bearings 10. Preferably at its rear end this is bent laterally to form a control handle 61. This control handle is to a certain degree resilient, in order that it may be engaged or disengaged with facility from the notches 20. At its forward end the shaft 6 extends forwardly of the bearings 10 and has secured thereto a T-fitting 7, which fitting has a forward extension 71 formed either integral therewith or as a pipe.

Secured in the lateral branch of the T-fitting is a signal arm 70 carrying at its outer end a light bulb 72 mounted within a casing 73 which has light apertures preferably at front and rear. By manipulating the control handle 61 to engage it with the various spaced notches 20, the position of the signal arm 70 and its signal light 72 may be varied at will.

The T-fitting 7, the signal arm 70 and the extension 71 are preferably made hollow in order that wires 87 to the light 72 and 88 to a spotlight 8 may be passed therethrough. The spotlight 8 is secured by means of any suitable bracket or clamp, as indicated at 81, to the extension 71. Here the spotlight is forward of all other accessories and yet it is accessible from the driver's seat. Although the shaft, and consequently the fitting 7 and the extension 71, rotate through approximately a half circle, by passing the wires 87 and 88 through these fittings and arms there is no tendency to disturb them or tangle them by this rotation.

Notches 20 may be provided for various positions of the arm 70, a vertical position being shown as the ordinary position when the signal is not in use, and a nearby position being shown as a running position, especially for night use, in which latter position the light 72 may also serve as a tail light. The next lower position serves to indicate a right turn, the horizontal position a left turn, and a position pointing downward the driver's intention to stop. In this latter position the device may be employed as a parking light.

By means of my invention I provide a support for all necessary accessories which is convenient for the driver, and which is adequately supported by a single clamp or bracket. As has been stated, the device is also adapted for use as a tail light and as a parking light, thus eliminating the necessity for these additional accessories.

What I claim as my invention is:

1. The combination with a bracket comprising a longitudinal strap having journal bearings along its upper edge, a circular-segmental strap having spaced notches in its edge, a transverse strap connecting the longitudinal strap and the circular-segmental strap, and extending outwardly of the longitudinal strap, and a supporting clamp secured to said longitudinal strap, of a shaft rotative within said bearings, and terminating at its rear end in an integral laterally extending control handle cooperating with said notched strap to maintain the shaft in adjusted angular positions, a signal arm secured upon said shaft, the shaft having an outward extension forward of its bearings for the reception and support of a spotlight, and said lateral strap being adapted to support a mirror on its outer end.

2. The combination with a bracket comprising a longitudinal strap having bearings along its upper edge, a circular segmental strap at its rear end, of a supporting clamp therefor comprising an arm adapted to be secured to a support and having a lateral extension, said extension being adapted to lie alongside of the longitudinal strap, and itself and the longitudinal strap having registering holes, a securing bolt passing through said holes, and extending transversely of the bracket in a horizontal plane, whereby the angle of said bracket in a vertical plane may be varied, a shaft journaled in said bearings, and a signal arm and a control arm extending laterally from said shaft, the control arm cooperating with the circular-segmental strap to maintain the signal arm in various adjusted angular positions.

3. As an article of manufacture, a bracket for the purpose specified comprising a longitudinal strap, a supporting clamp adapted to be secured thereto, journal bearings forming part of said clamp, a shaft rotatively mounted in said bearings, a signal arm and a control handle secured to said shaft, means carried by the bracket for positioning the handle in various positions corresponding to various signal arm positions, and an extension of said shaft outwardly of said journals being adapted for the reception of a spotlight.

Signed at Seattle, King County, Washington, this 3rd day of August, 1922.

EDWARD F. McGILLICUDDY.